United States Patent
Narasimhan et al.

(10) Patent No.: US 8,924,444 B2
(45) Date of Patent: Dec. 30, 2014

(54) SYSTEM AND METHOD FOR ANALYZING DATABASE RECORDS USING SAMPLING AND PROBABILITY

(75) Inventors: Sriram Narasimhan, Fremont, CA (US); Antonio Casacuberta, San Francisco, CA (US)

(73) Assignee: Responsys, Inc., San Bruno, CA (US)

( * ) Notice: Subject to any disclaimer, the term of this patent is extended or adjusted under 35 U.S.C. 154(b) by 594 days.

(21) Appl. No.: 13/231,842

(22) Filed: Sep. 13, 2011

(65) Prior Publication Data

US 2013/0066900 A1    Mar. 14, 2013

(51) Int. Cl.
*G06F 17/30* (2006.01)
(52) U.S. Cl.
CPC .............................. *G06F 17/30303* (2013.01)
USPC ........... 707/828; 707/608; 707/687; 707/705; 707/790; 707/813
(58) Field of Classification Search
USPC .......... 707/608, 687, 705, 790, 813, 822, 828
See application file for complete search history.

(56) References Cited

U.S. PATENT DOCUMENTS

2006/0155567 A1\* 7/2006 Walker et al. ..................... 705/1

\* cited by examiner

*Primary Examiner* — Sana Al Hashemi
(74) *Attorney, Agent, or Firm* — Vista IP Law Group, LLP

(57) ABSTRACT

A method for analyzing database records using sampling includes querying a recipient database for recipients with attributes that match one or more specified recipient attributes, querying a sampling database for transactions with attributes that match one or more specified transaction attributes, where the sampling database stores a subset of transactions that are also stored in a transaction database, intersecting the recipients resulting from the querying of the recipient database and the transactions resulting from the querying of the sampling database based on attributes thereof to create a set of joined sample results, and determining an approximate full count value by extrapolating a count value associated with the set of joined sample results based on both a total number of recipients in the recipient database and a total number of transactions in the transaction database.

20 Claims, 4 Drawing Sheets

SYSTEM AND METHOD FOR ANALYZING DATABASE RECORDS USING SAMPLING AND PROBABILITY

BACKGROUND

1. Field of the Invention

The present invention relates to the field of database querying, and, in particular, to a system and method for analyzing database records using sampling and probability.

2. Description of the Related Art

Marketers aim to build a list of known recipients with information about those recipients and the purchase transactions in which they engage. For example, an online marketer may track a known recipient (e.g., an existing customer) from a promotional email sent to the recipient containing a hyperlink to the marketer's website, to the actual purchase of a product using, for example, an online shopping cart. When the recipient purchases a product, the marketer obtains valuable information about the recipient's purchasing habits. The marketer may continue to track information about the recipient's purchases over time (such information referred to herein as "transaction data") to enhance its overall understanding of the recipient. The combination of such transaction data with personal attributes of the recipient such as gender, age, address and interests (such information referred to herein as "recipient data") allows the marketer to more accurately target users with relevant, personalized marketing promotions or other marketing content.

Typically, personal attributes for a given recipient may be updated from time to time, but the quantity of such data associated with a given recipient stays relatively constant over time. Thus, for a given marketer, the size of recipient data is proportional to the number of recipients who are known to the marketer, and grows only when the marketer identifies new recipients. Conversely, the size of the transaction data can grow quickly as recipients make purchases over time. Typically, recipient data is stored in a separate database or database table from transaction data.

Marketers often desire to send marketing content to recipients deemed likely to identify with the product or service being advertised in the content. Effective targeting relies on using both recipient data and transaction data. For example, a cycling merchant located in San Francisco may desire to send a particular promotion to a subset of its known customers, e.g., men who are between the ages of 18 and 40, reside in certain zip codes in the San Francisco Bay Area, and who have purchased one or more bicycle-related products in the past six months.

Marketers also often desire to know the approximate number of potential recipients of a proposed promotion before deciding to actually launch the promotion or modify the promotion. For example, if the number is low, the criteria may need to be loosened, and vice-versa. Traditionally, in order to determine such a number, the marketer would execute separate queries against the recipient database and the transaction database, join the results using an intersection or union set operation, and then either count or query the resulting data set. However, due to the large amounts of recipient data—and even larger amounts of transaction data—typically managed by marketers, running such database queries simply to obtain a count of potential recipients is prohibitive with respect to cost, time and computing resources. As a result, the number of queries that the marketer is able to effectively execute, and the marketer's ability to fine tune and effectively target marketing communications, is significantly reduced.

Accordingly, there remains a need in the art for a technique that addresses the drawbacks and limitations discussed above with respect to analyzing database records.

SUMMARY

One embodiment of the invention provides a method for analyzing database records using sampling. The method includes querying a recipient database for recipients with attributes that match one or more specified recipient attributes, querying a sampling database for transactions with attributes that match one or more specified transaction attributes, wherein the sampling database stores a subset of transactions that are also stored in a transaction database, intersecting the recipients resulting from the querying of the recipient database and the transactions resulting from the querying of the sampling database based on attributes thereof to create a set of joined sample results, and determining an approximate full count value by extrapolating a count value associated with the set of joined sample results based on both a total number of recipients in the recipient database and a total number of transactions in the transaction database.

Another embodiment of the invention provides a computer system comprising a processor configured to analyze database records using sampling. In particular, the computer system performs the steps of querying a recipient database for recipients with attributes that match one or more specified recipient attributes, querying a sampling database for transactions with attributes that match one or more specified transaction attributes, wherein the sampling database stores a subset of transactions that are also stored in a transaction database, intersecting the recipients resulting from the querying of the recipient database and the transactions resulting from the querying of the sampling database based on attributes thereof to create a set of joined sample results, and determining an approximate full count value by extrapolating a count value associated with the set of joined sample results based on both a total number of recipients in the recipient database and a total number of transactions in the transaction database.

Further embodiments of the present invention provide a non-transitory computer-readable storage medium that includes instructions for causing a computer system to carry out one or more of the methods set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF EXEMPLARY EMBODIMENTS

Figure 1:
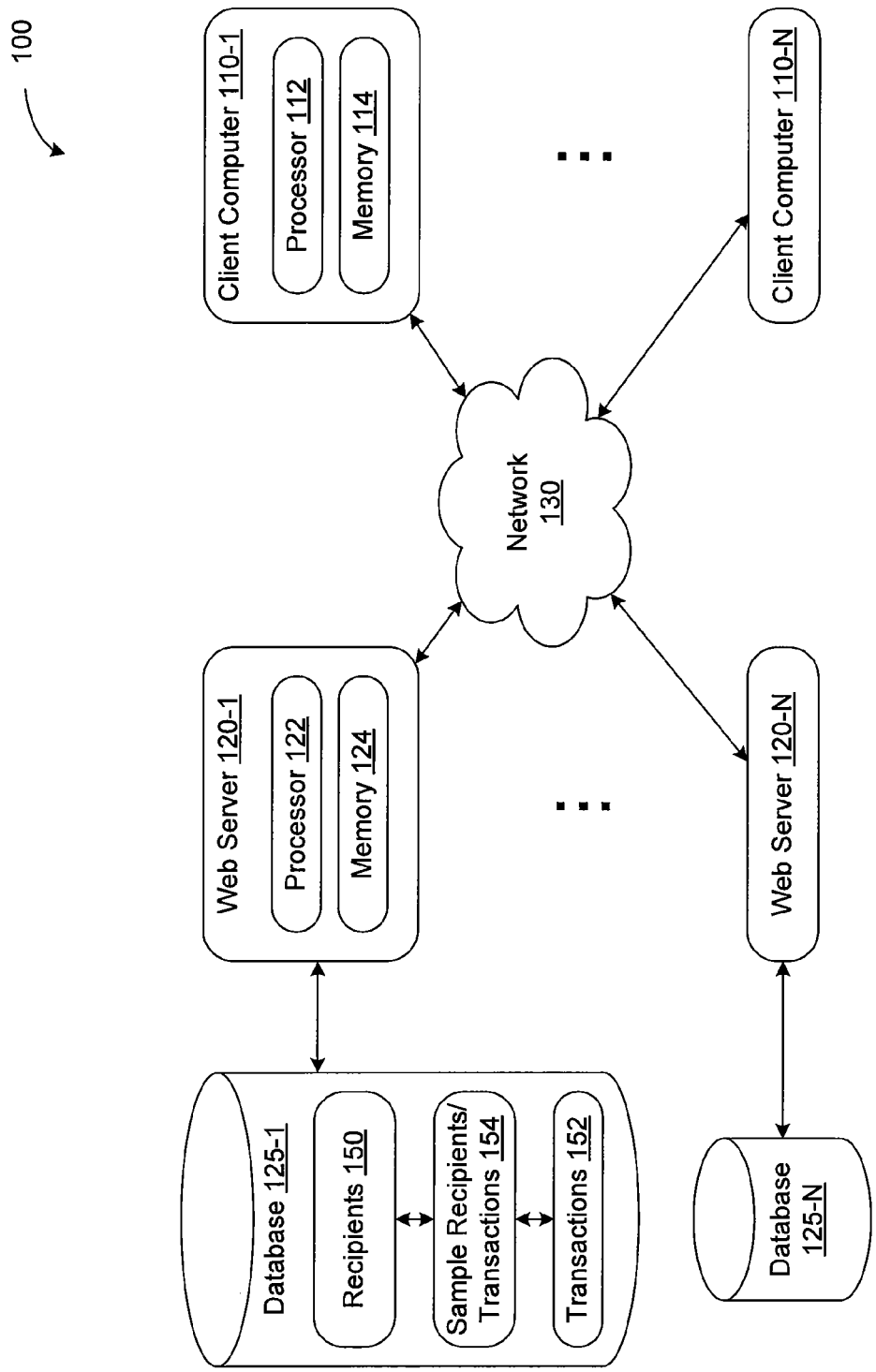
FIG. 1 illustrates a networked computer environment in which embodiments of the invention may be practiced.

FIG. 1 illustrates a networked computer environment 100 in which embodiments of the invention may be practiced. As shown, networked computer environment 100 includes a plurality of client computers 110 (only two of which are shown) and a plurality of web servers 120 with associated databases 125. Client computers 110 and web servers 120 are connected over a computer network 130, e.g., the Internet.

Each client computer 110 includes conventional components of a computing device, e.g., a processor 112, a system memory 114, a hard disk drive, input devices such as a mouse and a keyboard, and output devices such as a monitor, among others. Each web server 120 includes a processor 122 and a system memory 124, and manages the contents stored in respective database 125.

As shown, database 125-1 includes recipients 150, transactions 152, and sample recipients/transactions 154. In one embodiment, each of recipients 150, transactions 152, and sample recipients/transactions 154 are relational database tables. Recipients 150 is configured to store, for each recipient known to networked computer environment 100, a record that includes one or more attributes of the recipient, e.g., a unique identifier (ID), name, email address, billing address, gender, age, interests, and the like. Transactions 152 is configured to store, for each transaction executed by a recipient known to networked computer environment 100, a record that includes one or more attributes of the transaction, e.g., the unique ID of the recipient who executed the transaction, the date of the transaction, the specific products/services sold to the recipient, the monetary amount of the transaction, and the like. In one embodiment, sample recipients/transactions 154 is configured to actively maintain a sample dataset of transactions 152 associated with a given set of random sample recipients.

For example, if recipients 150 and transactions 152 include records relating to one-hundred thousand recipients and ten million transactions, respectively, then sample recipients/transactions 154 may include transaction records relating to ten thousand randomly-selected recipients. Moreover, sample recipients/transactions 154 can be configured to automatically update its transaction records when corresponding changes are made to transactions 152 for a recipient who is also a sample recipient, e.g., when insertions and/or updates occur, or to automatically add transaction records for a new sample recipient when a new recipient is added to recipients 150 and is associated with sample recipients/transactions 154. Sample recipients/transactions 154 may be adjusted to maintain a more accurate sample of transactions 152, e.g., by increasing the number of sample recipients whose data is stored in sample recipients/transactions 154, though overhead is increased as a result.

The web server 120 is programmed to communicate with client computers 110 and other web servers 120 using, e.g., the TCP/IP protocol. Client computers 110 are programmed to execute web browser programs and other software applications and access the web pages and/or applications managed by the web servers by specifying a uniform resource locator (URL) for the web server into the browser.

In the embodiments of the present invention described below, users are respectively operating client computers 110 that are connected to web servers 120 over the Internet. The web pages that are displayed to a user are transmitted from web servers 120 to that user's client computer 110 and processed by the web browser program stored in that user's client computer 110 for display through the monitor of that user's client computer 110.

Client computer 110 may be a personal computer, smart phone, touch pad, touch screen, or any other device suitable for practicing one or more embodiments of the present invention. It should be noted that the present invention can be implemented in hardware, software, or in a combination of hardware and software, e.g., using application specific integrated circuits (ASIC), a general purpose computer or any other hardware equivalents.

In one embodiment, the web server 120 may be configured to deliver a user interface to the user at the client computer 110 via the network 130. For example, the user interface may be displayed in a web browser executed by the client computer 110.

Analyzing Database Records

Embodiments of the invention provide a technique for analyzing database records using database sampling and probability. In particular, web server 120 queries recipients 150, transactions 152, and/or sample recipients/transactions 154 based on recipient attributes and/or transaction attributes that are provided by, e.g., a marketer requesting data from web server 120. As described herein, web server 120 may execute additional operations prior to executing the query, e.g., dynamically sampling recipients 150 and/or statically sampling transactions 152, which is described in detail below in conjunction with FIGS. 2-4 and significantly reduces the overall execution time of the query.

Figure 2:
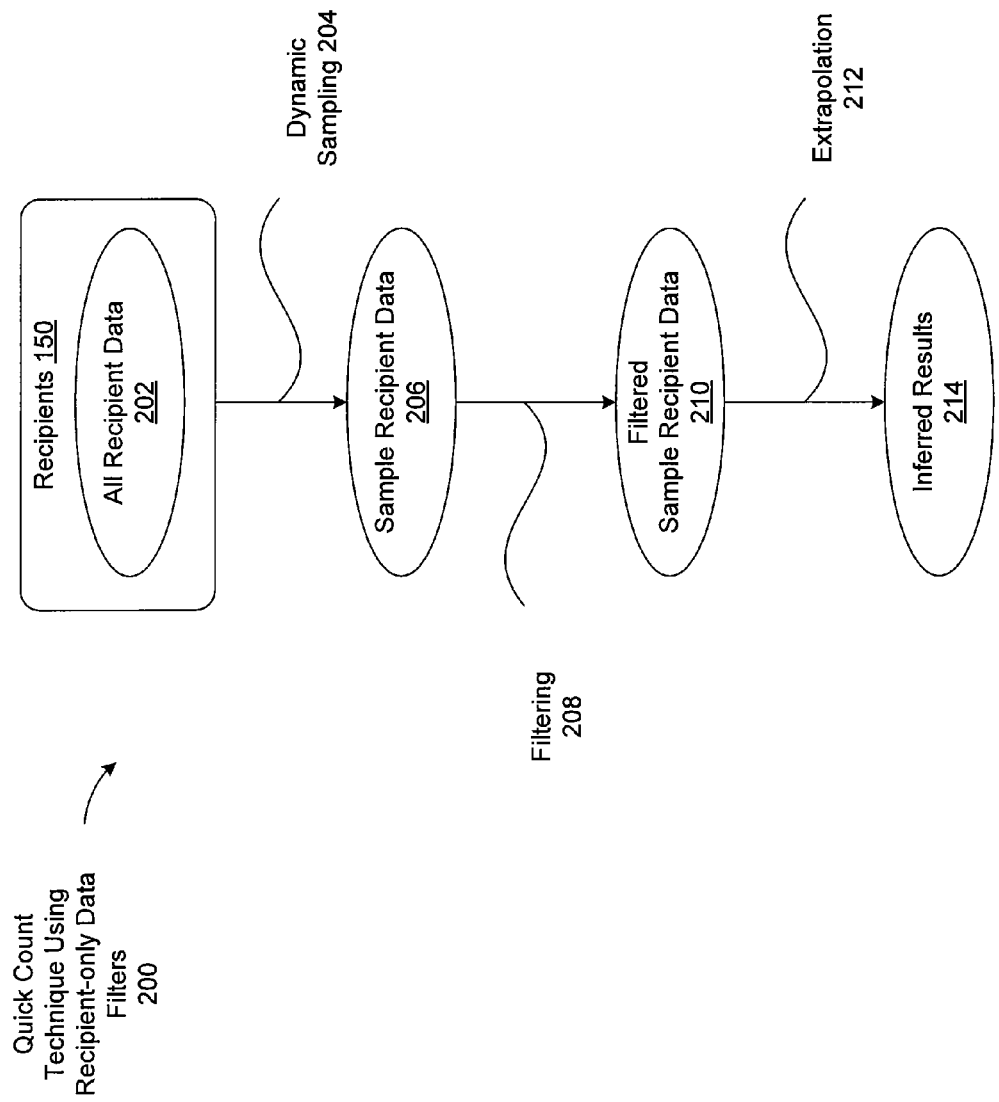
FIG. 2 is a conceptual diagram of performing a quick count technique using recipient-only data filters, according to one embodiment of the invention.

FIG. 2 is a conceptual diagram of performing a quick count technique using recipient-only data filters 200, according to one embodiment of the invention. Because recipient attributes can change over time, statically sampling recipients 150 and then maintaining the sample snapshot on an ongoing basis involves significant overhead. In addition, recipient data grows more slowly over time than transaction data. Therefore, dynamic sampling of recipients 150, where sampling data is extracted from recipients 150 on demand when a query to recipients 150 is requested, is practical to implement and avoids the overhead associated with maintaining a static sampling thereof. Most modern relational databases provide mechanisms to extract a random sample of the data stored therein.

As shown in FIG. 2, sample recipient data 206 is generated based on a dynamic sampling 204 of all recipient data 202 stored in recipients 150. In one embodiment, web server 120 is configured to execute dynamic sampling 204 based on settings specified by, for example, an administrator (e.g., a marketer) via the user interface described above in conjunction with FIG. 1. For example, web server 120 may be configured to sample ten percent of all recipient data 202 in order to create sample recipient data 206. In some embodiments, sample recipient data 206 is stored in a temporary database table that has the same schema as recipients 150.

Web server 120 executes filtering 208 based on recipient attributes specified by the administrator through the user interface. For example, the administrator may specify recipient attributes that target women between the ages of 18-30 who reside in Houston, Tex. Accordingly, web server 120 queries sample recipient data 206 for recipients that match the foregoing attributes, which yields filtered sample recipient data 210.

Next, web server 120 executes extrapolation 212, which involves reversing the sampling procedure performed through dynamic sampling 204—that is, taking the count of filtered sample recipient data 210 and extrapolating the count to an approximate result for all recipient data 202. Continuing with the example described above, and assuming that filtered sample recipient data 210 includes one-hundred entries, web server 120 multiplies the one hundred entries by the inverse of ten percent, i.e., a value of ten, to yield one thousand inferred results 214. Thus, the administrator may assume, based on the random sampling technique and basic probability theory, that all recipient data 202 includes approximately one thousand recipients who meet the criteria specified by the administrator. In this way, the amount of data that has to be analyzed to arrive at an approximate count for the results of the query is significantly reduced, which decreases latency and requires fewer operations to database 125.

Figure 3:
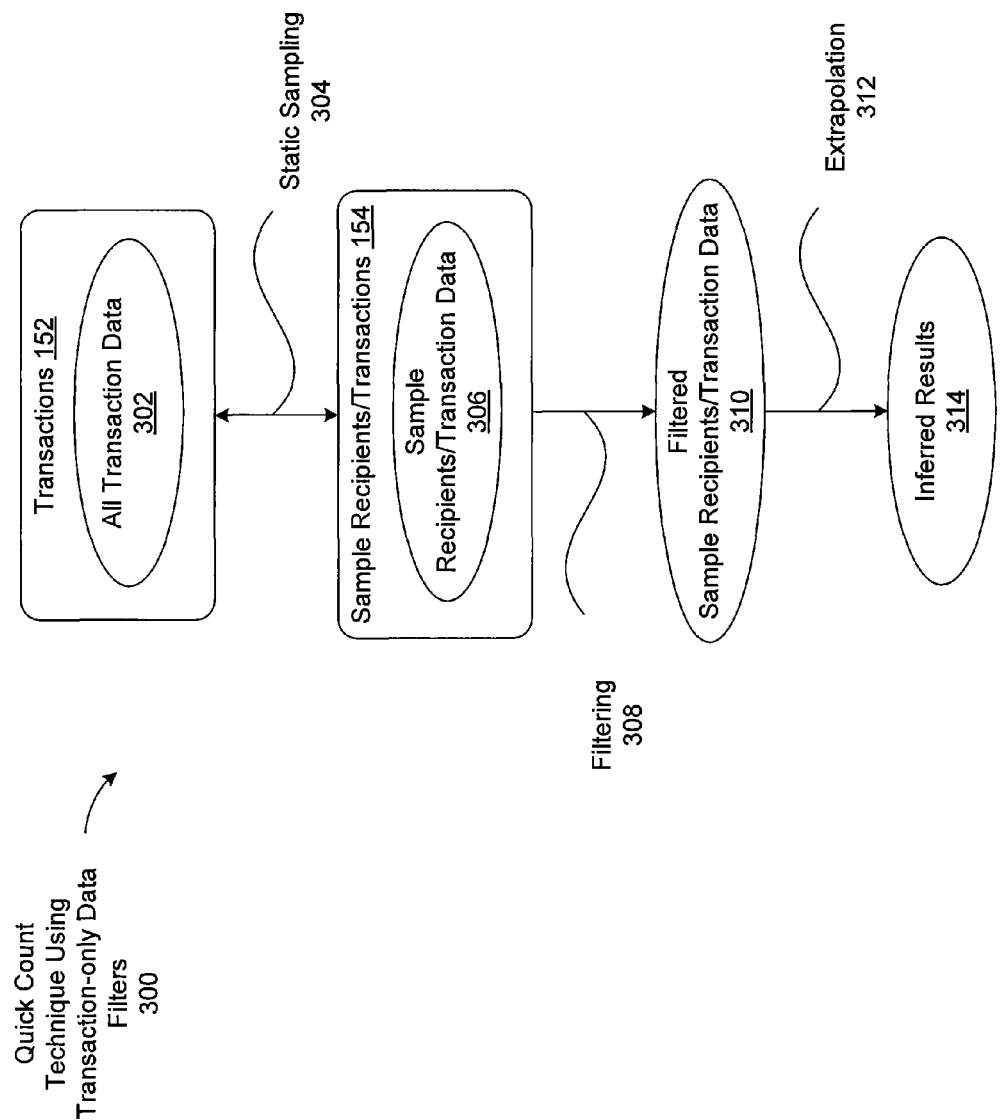
FIG. 3 is a conceptual diagram of performing a quick count technique using transaction-only data filters, according to one embodiment of the invention.

FIG. 3 is a conceptual diagram of performing a quick count technique using transaction-only data filters 300, according to one embodiment of the invention. As is commonly understood, transaction tables, such as transactions 152, receive frequent inserts, and rarely receive updates and deletes. Because of the size of transactions 152, it is generally impractical to employ dynamic sampling of this database. Therefore, embodiments of the invention implement static sampling of all transaction data 302 included in transactions 152 to create sample recipients/transaction data 306, where sampling data is initially extracted from all transaction data 302 for a given set of random recipients and then updated as changes are made to transactions 152 for such sample recipients. For example, as the sample recipients engage in additional transactions over time, the transaction data associated with such additional transactions will be added to sample recipients/transaction data 306. In particular, static sampling involves identifying at random a sample number of recipients in recipients 150, where the random sample can grow progressively as recipients are added to recipients 150. Transactions of each recipient in the random sample are then monitored and tracked. Because the size of the random sample of recipients is only a small fraction of all recipients in recipients 150, the size of the transactions associated with those sample recipients is accordingly limited.

As shown in FIG. 3, sample transaction data 306 is generated based on a static sampling 304 of all transaction data 302 stored in transactions 152 associated with the given random sampling of recipients. In one embodiment, web server 120 is configured to execute static sampling 304. Alternatively, database 125, which stores transactions 152 and sample recipients/transactions 154, may include therein a software engine that automates static sampling 304 independent of web server 120. As with the dynamic sampling 204 described above, static sampling 304 may be configured to sample a percentage of all transaction data 302, e.g., eight percent, in order to maintain sample recipients/transaction data 306 within sample recipients/transactions 154.

Web server 120 executes filtering 308 based on transaction attributes specified by the administrator through the user interface. For example, the administrator may specify transaction attributes that target transactions associated with a certain genre and locale, such as skiing/snowboarding equipment purchases in Mammoth, Calif. Accordingly, web server 120 queries sample recipients/transaction data 306 for transactions that match the foregoing transaction attributes, which yields filtered sample recipients/transaction data 310.

Web server 120 then executes extrapolation 312 according to the techniques described above in conjunction with FIG. 2. For example, assuming that filtered sample recipients/transaction data 310 includes ten thousand entries, web server 120 multiplies the ten-thousand entries by the inverse of eight percent, i.e., a value of 12.5, to yield one hundred twenty-five thousand inferred results 314. Thus, the administrator may assume, based on the sampling technique and basic probability theory, that all transaction data 302 includes approximately one hundred twenty-five thousand recipients who meet the criteria specified by the administrator. Again, the amount of data that has to be analyzed to arrive at an approximate count for the results of the query is significantly reduced, which decreases latency and requires fewer operations to database 125.

Figure 4:
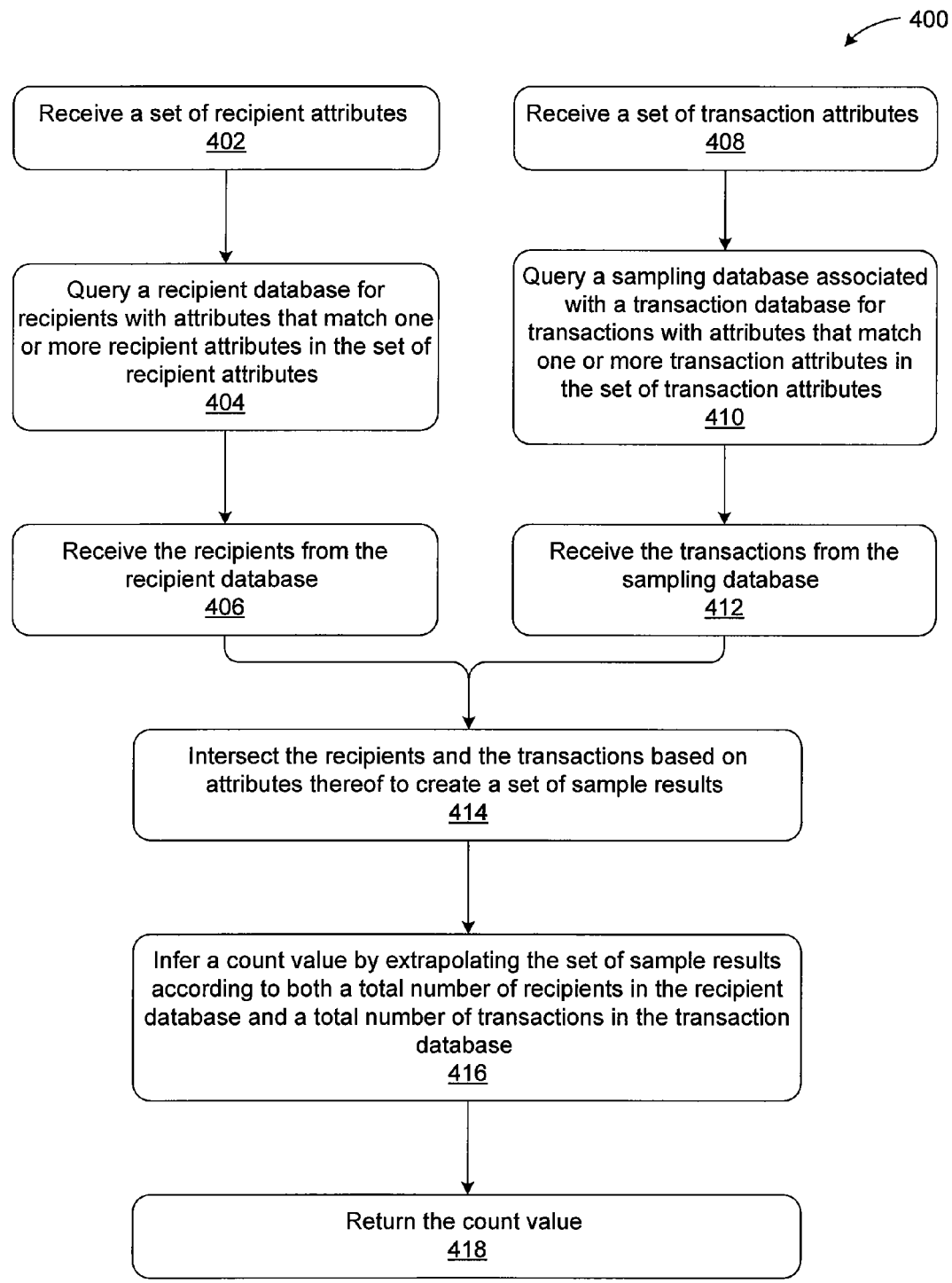
FIG. 4 is a flow diagram of a method for performing a quick count technique using both recipient data filters and transaction data filters, according to one embodiment of the invention.

FIG. 4 is a flow diagram of a method 400 for performing a quick count technique using both recipient data filters and transaction data filters, according to one embodiment of the invention. Persons skilled in the art will understand that, even though the method 400 is described in conjunction with FIGS. 1-4, any system configured to perform the method steps is within the scope of embodiments of the invention.

As shown, method 400 begins at step 402, where web server 120 receives a set of recipient attributes. As described herein, such recipient attributes may be submitted by an administrator via a user interface. In some embodiments, the user interface may display each available recipient attribute as a selectable checkbox, which enables the administrator to build complex criteria. For example, the administrator may select one or more checkboxes to target men between the ages of 25 and 35 who are located in New York and enjoy tennis.

At step 404, web server 120 queries a recipient database, e.g., recipients database 150, for recipients with attributes that match one or more recipient attributes in the set of recipient attributes. In some cases, web server 120 may first create sample recipient data, as described above in conjunction with FIG. 2, if the recipient database includes a number of records that exceeds a threshold value. In turn, the overall latency of executing method 400 may be reduced. Accordingly, at step 406, web server 120 receives the recipients from the recipient database based on the query executed in step 404.

At step 408, web server 120 receives a set of transaction attributes. Continuing with the example described above, the administrator may select one or more transaction attributes via user interface checkboxes, for example, tennis-related purchases within the last six months.

At step 410, web server 120 queries a sampling database associated with a transaction database, e.g., sample recipients/transactions 154 and transactions 152, respectively, for sample transactions with attributes that match the specified set of transaction attributes. Accordingly, at step 412, web server 120 receives the resulting transactions from the sampling database.

At step 414, web server 120 intersects the resulting recipients and the resulting transactions to create a set of joined sample results. In particular, such intersection comprises both removing resulting recipients that do not correspond to any of the resulting transactions and removing resulting transactions that do not correspond to any of the resulting recipients.

At step 416, web server 120 infers an approximate count value for the query at issue by extrapolating the set of joined sample results according to both a total number of recipients in the recipient database and a total number of transactions in the transaction database, as described above in FIGS. 2 and 3. At step 418, web server 120 returns the count value, which may be displayed within the user interface.

In sum, embodiments of the invention provide a technique for analyzing database records using database sampling and probability theory. Recipient data and transaction data are dynamically and/or statically sampled. The sampled recipient data and/or sampled transaction data is filtered based on target attributes included in a query, which reduces the overall execution time of obtaining an approximate count of the results of the query when compared to querying both the entire recipient database and the entire transaction database. The count of the filtered data set is then extrapolated based on the size of the recipient data and/or the size of the transaction data, thereby yielding a result that approximates the result that would be yielded if the recipient data and the transaction data were queried as a whole.

Various embodiments of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention. The foregoing description and drawings are, accordingly, to be regarded in an illustrative rather than a restrictive sense.

What is claimed is:

1. A method for analyzing database records using sampling, the method comprising:
    querying a recipient database for recipients with attributes that match one or more specified recipient attributes;
    querying a sampling database for transactions with attributes that match one or more specified transaction attributes, wherein the sampling database stores a subset of transactions that are also stored in a transaction database;
    intersecting the recipients resulting from the querying of the recipient database and the transactions resulting from the querying of the sampling database based on attributes thereof to create a set of joined sample results; and
    determining an approximate full count value by extrapolating a count value associated with the set of joined sample results based on both a total number of recipients in the recipient database and a total number of transactions in the transaction database.

2. The method of claim 1, wherein the subset of transactions comprises transactions associated with a given random sampling of recipients.

3. The method of claim 1, wherein the sampling database is automatically updated when a new record associated with a recipient in the sampling database is added to the transaction database.

4. The method of claim 1, wherein each recipient corresponds to a plurality of transactions and each transaction corresponds to only one recipient.

5. The method of claim 4, wherein intersecting the recipients and the transactions comprises both removing recipients that do not correspond to any of the transactions and removing transactions that do not correspond to any of the recipients.

6. The method of claim 1, wherein the recipient database includes only a sample dataset of a different recipient database.

7. The method of claim 1, wherein extrapolating the set of sample results involves multiplying the sampled count value by the inverse of the sampling percentage value implemented by the sampling database.

8. The method of claim 1, wherein the count value is displayed in a user interface.

9. A computer-readable medium storing instructions that, when executed by a processor, cause a computer system to analyze database records using sampling, by performing the steps of:
    querying a recipient database for recipients with attributes that match one or more specified recipient attributes;
    querying a sampling database for transactions with attributes that match one or more specified transaction attributes, wherein the sampling database stores a subset of transactions that are also stored in a transaction database;
    intersecting the recipients resulting from the querying of the recipient database and the transactions resulting from the querying of the sampling database based on attributes thereof to create a set of joined sample results; and
    determining an approximate full count value by extrapolating a count value associated with the set of joined sample results based on both a total number of recipients in the recipient database and a total number of transactions in the transaction database.

10. The computer-readable medium of claim 9, wherein the subset of transactions comprises transactions associated with a given random sampling of recipients.

11. The computer-readable medium of claim 9, wherein the sampling database is automatically updated when a new record associated with a recipient in the sampling database is added to the transaction database.

12. The computer-readable medium of claim 9, wherein each recipient corresponds to a plurality of transactions and each transaction corresponds to only one recipient.

13. The computer-readable medium of claim 12, wherein intersecting the recipients and the transactions comprises both removing recipients that do not correspond to any of the transactions and removing transactions that do not correspond to any of the recipients.

14. The computer-readable medium of claim 9, wherein the recipient database includes only a sample dataset of a different recipient database.

15. The computer-readable medium of claim 9, wherein extrapolating the set of sample results involves multiplying the sampled count value by the inverse of the sampling percentage value implemented by the sampling database.

16. A computer system, comprising:
    a processor configured to analyze database records using sampling, by performing the steps of:
        querying a recipient database for recipients with attributes that match one or more specified recipient attributes;
        querying a sampling database for transactions with attributes that match one or more specified transaction attributes, wherein the sampling database stores a subset of transactions that are also stored in a transaction database;

intersecting the recipients resulting from the querying of the recipient database and the transactions resulting from the querying of the sampling database based on attributes thereof to create a set of joined sample results; and determining an approximate full count value by extrapolating a count value associated with the set of joined sample results based on both a total number of recipients in the recipient database and a total number of transactions in the transaction database.

17. The system of claim 16, wherein each recipient corresponds to a plurality of transactions and each transaction corresponds to only one recipient.

18. The system of claim 17, wherein intersecting the recipients and the transactions comprises both removing recipients that do not correspond to any of the transactions and removing transactions that do not correspond to any of the recipients.

19. The system of claim 16, wherein the recipient database includes only a sample dataset of a different recipient database.

20. The system of claim 16, wherein extrapolating the set of sample results involves multiplying the sampled count value by the inverse of the sampling percentage value implemented by the sampling database.

* * * * *